G. LEHBERGER.
PROPELLER DRIVE FOR AIRSHIPS.
APPLICATION FILED JULY 30, 1915.

1,184,757.

Patented May 30, 1916.
2 SHEETS—SHEET 2.

Witnesses
Frederick W. Ely,
M. L. Taft.

Inventor
George Lehberger,
By Victor J. Evans
Attorney

UNITED STATES PATENT OFFICE.

GEORGE LEHBERGER, OF BROOKLYN, NEW YORK.

PROPELLER-DRIVE FOR AIRSHIPS.

1,184,757.     Specification of Letters Patent.     Patented May 30, 1916.

Application filed July 30, 1915. Serial No. 42,806.

*To all whom it may concern:*

Be it known that I, GEORGE LEHBERGER, a citizen of the United States, residing at Brooklyn, in the county of Kings and State of New York, have invented new and useful Improvements in Propeller-Drives for Airships, of which the following is a specification.

This invention relates to power transmissions especially adapted to be used for transmitting power from an engine upon an aeroplane to the propellers thereof and it consists in the novel features hereinafter described and claimed.

An object of the invention is to provide a transmission of simple and durable structure especially adapted to be used for the purpose stated although the mechanism may be used to advantage when applied to machines or devices other than aeroplanes.

With the above object in view the structure includes in combination with a driving shaft a sprocket wheel fixed thereto and rotatable with the shaft and a beveled gear wheel fixed to the shaft. The said shaft is journaled in a hub which is supported by brackets mounted upon fixed points with relation to the shaft and pinions are journaled upon the said hub and mesh with the said gear wheel. A second gear wheel is journaled upon the shaft and meshes with the said pinions and is provided with an out-standing collar upon which a sprocket wheel of the same dimension as the first mentioned sprocket wheel is mounted. The parts are so arranged that when the first mentioned sprocket wheel is rotated by the shaft in one direction the second mentioned sprocket wheel is rotated at the same rate of speed in an opposite direction. A casing is carried by the said hub and brackets and incloses the gear wheels and pinions and may contain a sufficient quantity of oil to efficiently lubricate the parts located therein.

Figure 1:
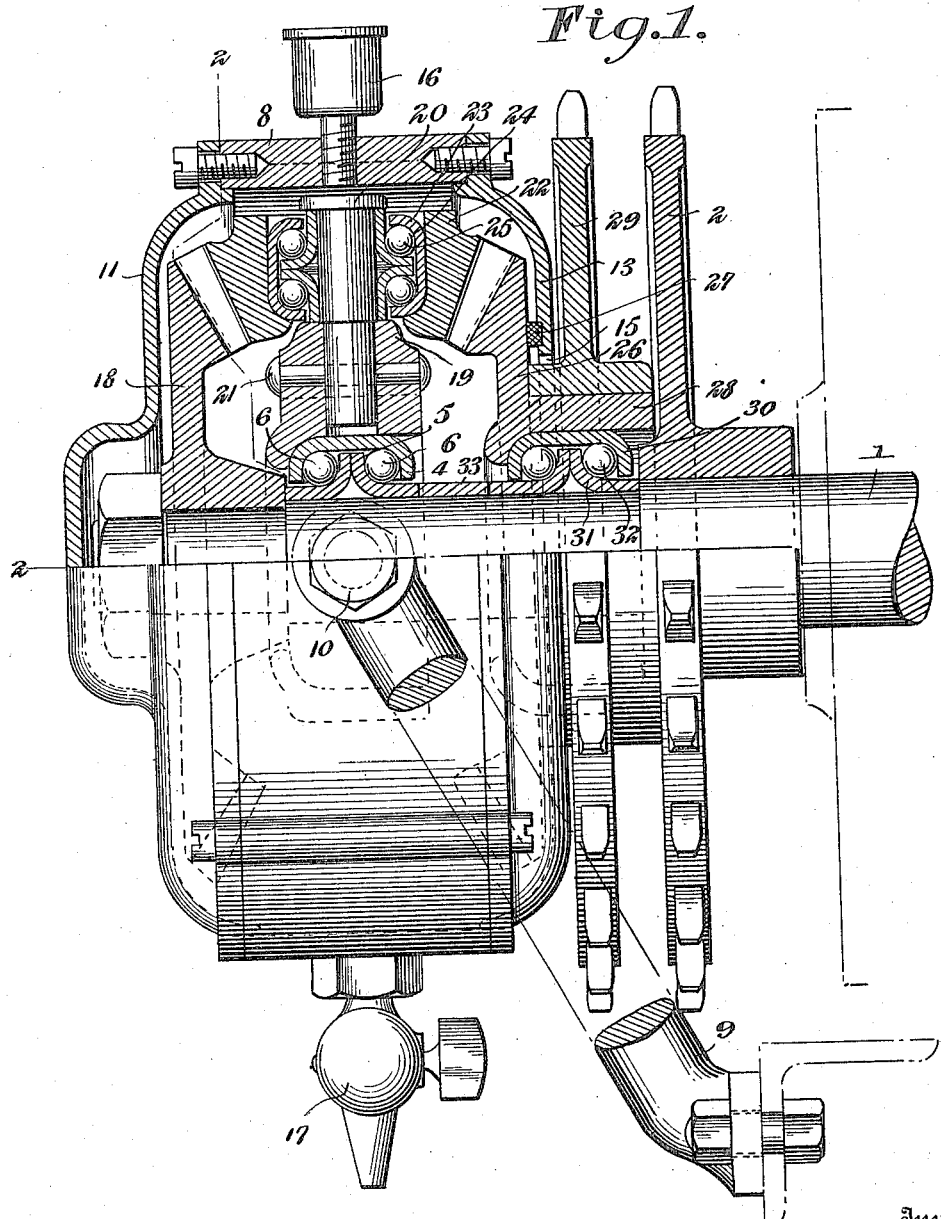
Figure 2:
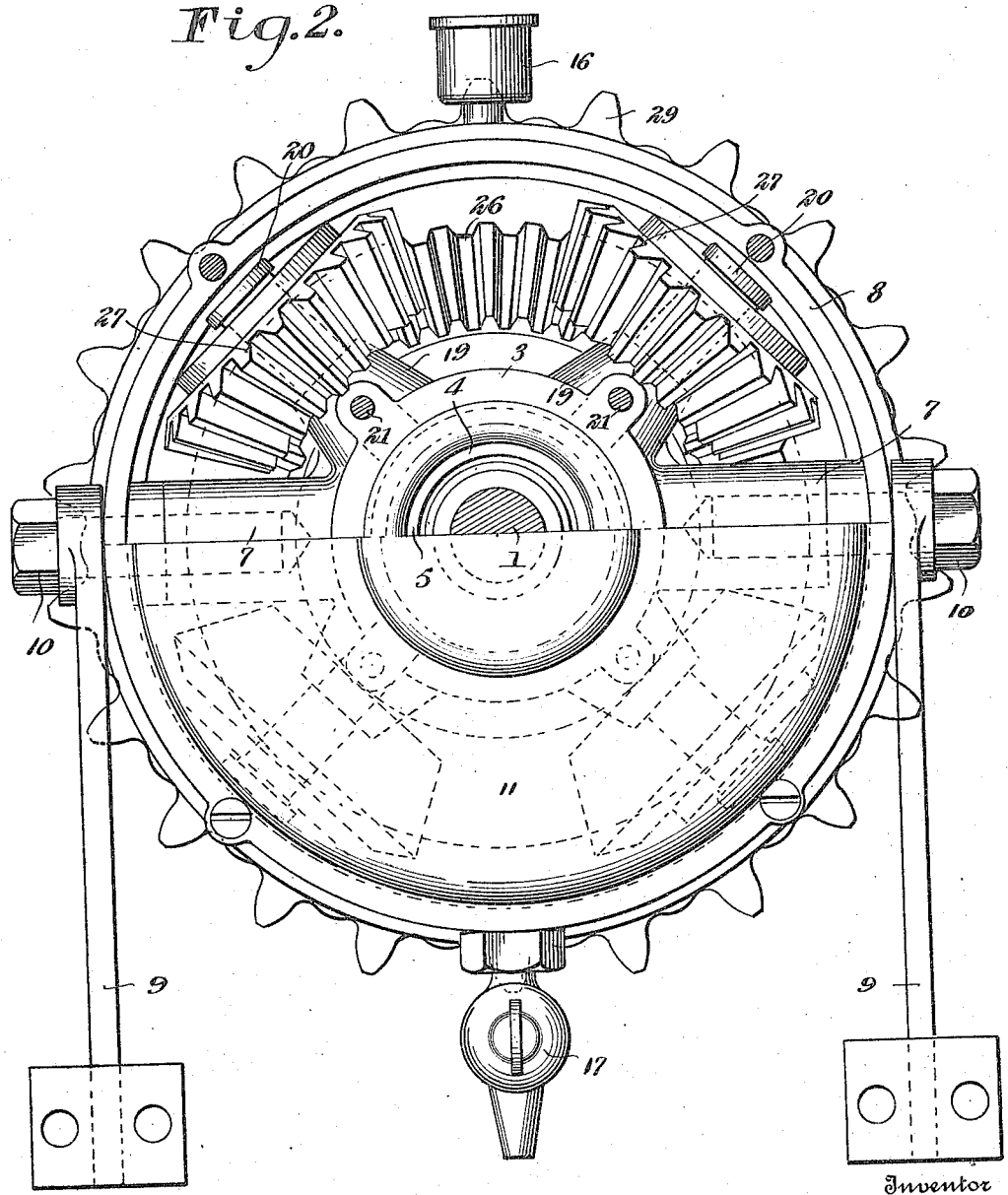

In the accompanying drawings:—Figure 1 is a side elevation of the transmission with parts broken away and parts in section. Fig. 2 is a front elevation of the same, with parts broken away and removed on the line 2—2 of Fig. 1.

The transmission includes a driving shaft 1 which may be operated directly from an engine (not shown) or operatively connected therewith in any suitable manner. A sprocket wheel 2 is fixed to the shaft 1 and rotates in unison with the same and in the same direction. A hub 3 surrounds the shaft 1 and is provided with an interiorly located ball race 4 and which surrounds ball races 5 mounted upon the shaft 1. Bearing balls 6 are interposed between the races 4 and 5 and serve as antifriction means for supporting the shaft 1 and hub 3 with relation to each other. Arms 7 are connected with the opposite side of the hub 3 and an annular ring 8 is connected with the outer ends of the said arms as best shown in Fig. 2 of the drawings. Brackets 9 are mounted upon fixed supports at the opposite sides of the shaft 1 and are connected at their upper end with the ring 8 and arms 7 by means of tap screws 10. A plate 11 is secured to the outer edge of the ring 8 and closes the same. Said plate is secured to the ring by means of tap screws or other suitable securing devices. A plate 13 is secured to the inner edge of the ring 8 by means of tap screws 14 or other suitable devices and the said plate 13 is provided at its center with an opening 15. The ring 8 and the plates 11 and 13 constitute a casing for inclosing parts hereinafter to be explained. An oil cup 16 is mounted at the under side of the ring 8 and is adapted to contain a lubricating oil which may be fed as desired to the interior of the said casing and the parts located therein. A pet cock 17 is mounted at the lower side of the ring 8 and may be used as means for draining the casing of which the ring 8 is a component of its contents. A beveled gear wheel 18 is fixed to the shaft 1 and is located within the ring 8 adjacent the plate 11. The hub 3 is provided upon its periphery with a series of radially disposed bosses 19 which carry radially disposed studs 20 secured therein by means of rivets or other suitable securing devices indicated at 21. Beveled pinions 22 are journaled upon the studs 20 and mesh with the teeth of the gear wheel 18.

Ball races 23 are located in the interiors of the pinions 22 and surround ball races 24 mounted upon the studs 20. Bearing balls 25 are interposed between the races 23 and 24 and serve as anti-friction means between the pinions 22 and the studs 20. A beveled gear wheel 26 surrounds the shaft 1 and is located adjacent the plate 13 and meshes with the pinions 22 at the opposite sides thereof from those sides at which the teeth of the beveled gear wheels 18 engage the same. A packing gland 27 is interposed between the plate 13 and the side of the beveled gear wheel 26 and surrounds the opening 15 in the said plate. The gear wheel 26 is provided with a concentrically positioned out-standing annular collar 28 upon which is mounted a sprocket wheel 29 of the same diameter as the sprocket wheel 3 and carrying the same number of sprocket teeth. A ball race 30 is located within the collar 28 and surrounds ball races 31 mounted upon the shaft 1. Bearing balls 32 are interposed between the races 30 and 31 and serve as anti-friction means between the collar 28 of the wheel 26 and the shaft 1. A spacing ring 33 surrounds the shaft 1 and is located between the adjacent ball races 31 and 5 and holds the said races in proper position with relation to each other.

From the above description taken in conjunction with the accompanying drawings it will be seen that when the sprocket wheel 2 is rotated with the shaft 1 in one direction the sprocket wheel 29 is rotated in an opposite direction but at the same rate of speed as the sprocket wheel 2. Therefore when chain belts (not shown) are applied to the said sprocket wheels and trained about the shafts of propellers (not shown) the said propellers are rotated in opposite directions at the same rate of speed and it is not necessary to cross the belts but the belts move in elliptical or orbital paths about the said sprocket wheels. This is due to the fact that the gear wheel 18 is fixed to the shaft 1 and rotates with the same and the said gear wheel rotates the pinions 22 which are journaled upon the fixed studs 20. In turn the pinions 22 rotate the gear wheel 26 in a direction opposite to that in which the gear wheel 18 rotates and inasmuch as the sprocket wheel 19 is fixed with relation to the gear wheel 26 the sprocket wheel 29 is rotated in a direction opposite to that in which the sprocket wheel 2 is rotated.

Therefore it will be seen that a simple and efficient means is provided for simultaneously rotating the sprocket wheels in opposite directions at the same rate of speed and that the device may be used to advantage upon aeroplanes and similar machines for transmitting movement in a direct and efficient manner from the engine to the propellers without requiring the necessity of crossing the transmission belts or chains.

Having described the invention what is claimed is:—

A transmission comprising a driving shaft, a wheel fixed thereto, a wheel journaled thereon, means for transmitting movement from the shaft to the journaled wheel, a casing inclosing the transmission means and having an opening through which the driving shaft passes, said journaled wheel having a hub which passes through the opening in the casing, and a packing located in the casing and surrounding said opening and the hub of the journaled wheel and bearing against the casing and the movement transmitting means located therein.

In testimony whereof I affix my signature in presence of two witnesses.

GEORGE LEHBERGER.

Witnesses:
M. E. LAUGHLIN,
GEO. A. BYRNE.

Copies of this patent may be obtained for five cents each, by addressing the "Commissioner of Patents, Washington, D. C."